US012584377B2

(12) United States Patent
Watkins et al.

(10) Patent No.: US 12,584,377 B2
(45) **Date of Patent: *Mar. 24, 2026**

(54) DELAYED OPENING PORT ASSEMBLY

(71) Applicant: ExxonMobil Technology and Engineering Company, Spring, TX (US)

(72) Inventors: Tom Watkins, Calgary (CA); Todd Machacek, Calgary (CA); Bashkim Veizaj, Calgary (CA); Scott Sherman, Calgary (CA)

(73) Assignee: ExxonMobil Technology and Engineering Company, Spring, TX (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/952,767

(22) Filed: Sep. 26, 2022

(65) Prior Publication Data

US 2023/0012820 A1 Jan. 19, 2023

Related U.S. Application Data

(63) Continuation of application No. 16/582,821, filed on Sep. 25, 2019, now Pat. No. 11,454,087.

(51) Int. Cl.

| | |
|---|---|
| ***E21B 34/06*** | (2006.01) |
| ***E21B 33/12*** | (2006.01) |
| ***G09G 5/377*** | (2006.01) |

(52) U.S. Cl.

CPC ........ *E21B 34/063* (2013.01); *E21B 33/1208* (2013.01); *G09G 5/377* (2013.01); *G09G 2340/0464* (2013.01); *G09G 2354/00* (2013.01)

(58) Field of Classification Search

CPC ............... E21B 33/1208; E21B 34/063; E21B 2200/06; E21B 34/085

See application file for complete search history.

(56) References Cited

U.S. PATENT DOCUMENTS 3,994,338 A * 11/1976 Hix ...................... E21B 34/063 417/434

4,979,569 A 12/1990 Anyan et al.

(Continued)

FOREIGN PATENT DOCUMENTS

| | | |
|---|---|---|
| CA | 2901074 A1 | 12/2016 |
| GB | 2556480 B | 5/2018 |

*Primary Examiner* — Robert E Fuller

(74) *Attorney, Agent, or Firm* — Troutman Pepper Locke LLP

(57) ABSTRACT

A port assembly for controlling fluid flow through a flow port of a port sub. The port assembly comprises a dissolvable barrier, a burst disk for protecting the dissolvable barrier from fluids inside the port sub, and optionally a protective layer for protecting the dissolvable barrier from external fluids. When the burst disk is ruptured by increased fluid pressure inside the port sub, the dissolvable barrier starts disintegrating from exposure to the fluid. When the dissolvable barrier and protective layer are broken through, a flow passage is opened in the port assembly to permit fluid flow therethrough. The flow passage may be positioned tangentially in the port sub. The breakthrough time of the dissolvable barrier may be preconfigured by providing one or more thinner areas therein and/or placing a corrosive material in the port assembly.

40 Claims, 6 Drawing Sheets

(56) References Cited

U.S. PATENT DOCUMENTS

| | | | | |
|---|---|---|---|---|
| 5,819,853 | A | 10/1998 | Patel | |
| 7,451,815 | B2 | 11/2008 | Hailey, Jr. | |
| 8,672,030 | B2 * | 3/2014 | Sherman | E21B 34/063 175/339 |
| 8,863,850 | B2 | 10/2014 | Sherman et al. | |
| 9,121,266 | B2 * | 9/2015 | Sherman | E21B 34/063 |
| 9,441,440 | B2 | 9/2016 | Hofman et al. | |
| 9,441,446 | B2 | 9/2016 | Fripp et al. | |
| 9,458,692 | B2 * | 10/2016 | Fripp | E21B 33/1208 |
| 9,650,851 | B2 | 5/2017 | Whitsitt et al. | |
| 9,752,412 | B2 | 9/2017 | Shkurti et al. | |
| 9,816,350 | B2 | 11/2017 | Mailand et al. | |
| 9,976,394 | B1 * | 5/2018 | Campbell | E21B 43/10 |
| 10,036,229 | B2 | 7/2018 | Bacsik et al. | |
| 10,066,461 | B2 | 9/2018 | Hardesty et al. | |
| 10,156,126 | B2 | 12/2018 | Hardesty et al. | |
| 10,208,570 | B2 | 2/2019 | Hardesty et al. | |
| 10,253,597 | B2 | 4/2019 | Hardesty et al. | |
| 10,273,780 | B2 | 4/2019 | Garcia et al. | |
| 10,280,707 | B2 * | 5/2019 | Styler | E21B 34/063 |
| 10,422,199 | B1 * | 9/2019 | Subbaraman | E21B 33/1208 |
| 10,767,443 | B2 * | 9/2020 | Bellavance | E21B 34/063 |
| 10,858,906 | B2 * | 12/2020 | Saraya | E21B 33/1208 |
| 11,199,069 | B2 * | 12/2021 | Fripp | E21B 43/12 |
| 2014/0318780 | A1 | 10/2014 | Howard | |
| 2015/0369007 | A1 * | 12/2015 | George | E21B 34/063 166/305.1 |
| 2016/0208575 | A1 | 7/2016 | Bellavance et al. | |
| 2018/0045014 | A1 * | 2/2018 | Larisey | E21B 37/10 |
| 2018/0328139 | A1 * | 11/2018 | Mhaskar | E21B 34/063 |
| 2019/0003266 | A1 * | 1/2019 | Zhou | E21B 34/063 |
| 2019/0024498 | A1 * | 1/2019 | Coon | E21B 34/063 |
| 2023/0399917 | A1 * | 12/2023 | Fripp | C22C 12/00 |

* cited by examiner

DELAYED OPENING PORT ASSEMBLY

CROSS-REFERENCE TO RELATED APPLICATIONS

This application is a continuation of U.S. patent application Ser. No. 16/582,821, filed on Sep. 25, 2019, which claims the benefit of U.S. Provisional Application Ser. No. 62/736,322, filed on Sep. 25, 2018, and of U.S. Provisional Application Ser. No. 62/760,763, filed on Nov. 5, 2018, all of which are hereby incorporated by reference in their entireties.

FIELD

The present disclosure relates to a port assembly usable in a port sub for use in downhole operations and more particularly to a port assembly that provides a delayed opening sequence for a flow port in the port sub which may be useful for pressure testing and/or actuating a wellbore tool, such as a hydraulically actuated tool.

BACKGROUND

Trican Well Service Ltd. developed the first “toe port sub” as part of its Burst Port System® (“BPS”). The Trican toe port sub, installed near the bottom (“toe”) of a wellbore, enables an operator to open one or more flow ports between the wellbore and the formation at the distal end of the wellbore. The flow ports are designed to open at precise pressures to provide the operator with more control over the diversion of the fractures. The flow ports enable a first ball of a ball drop completion to be circulated into the wellbore or a first set of perforating guns to be pumped into the wellbore. Prior to the development of the BPS, coiled tubing or tractors were used to shift the first ball drop sleeve open or to convey perforation guns into the wellbore.

Some jurisdictions require a pressure test of the casing string of the wellbore to 80% to 100% of the casing yield pressure. The test is conducted to check for leaks in the casing string that could lead to contamination of ground water or issues with zonal isolation. During the casing pressure test, the hydrostatic pressure inside the wellbore can be as high as about 42 MPa (about 6000 psi). Taking into account the existing hydrostatic pressure at the toe of the wellbore, the actual pressure at the toe during the casing pressure test is considerably greater than test pressure in the casing near the surface. Therefore, the toe port sub, installed at the toe of the wellbore, is exposed to pressures much greater than the surface test pressure. While factors such as fluid density of the test fluid may not be a concern near surface, such factors may have a significant effect on the actual pressure experienced by the toe port sub, due to the additional hydrostatic pressure at the toe of the wellbore.

The Trican BPS or any system that relies on precise pressures to open flow ports does not allow a casing pressure test to be conducted because the burst disks or sliding sleeves, which are typically used in such a system for opening the flow ports, cannot withstand the actual test pressure without inadvertently opening the flow ports. To overcome this issue, it is common practice to install a ball seat in the casing string directly above the toe port. When a flow port at the toe is accidentally opened during the pressure test, a dissolvable ball is pumped into the ball seat to stop fluid flow through the open flow port so that the casing pressure test can be completed. The dissolvable ball subsequently dissolves, and the open flow port can be used to circulate the first ball of a ball drop completion or to convey perforation guns into the wellbore.

The use of a dissolvable ball and ball seat increases the cost of wellbore operations. Another disadvantage of the dissolvable ball and ball seat configuration is that it slows down wellbore operations because it takes time to pump the ball down to the seat.

Some prior art flow ports have an outer cap that is displaced into the wellbore when the flow port is opened and, once displaced, such a cap can leave debris in the wellbore which could block flow paths and impede production of the subterranean formation.

In other wellbore operations, one or more hydraulically actuated tools may be installed in a wellbore, for example, as a component in a wellbore string, and such tools typically have mechanisms that are driven by hydraulic pressure. Such mechanisms may include burst inserts, sleeves, pistons, etc. Pressures communicated through the wellbore, for example, through the string via one or more flow ports may be used to selectively actuate the tools. More specifically, the flow ports are opened to hydraulically actuate the tools. However, there is a risk that the mechanism of a hydraulically actuated tool can be actuated prematurely if there is a pressure spike in the wellbore. In particular, during a casing pressure test, if the flow ports are accidentally opened due to the test pressures then the tool's mechanism will function prematurely.

Therefore, a need exists for an alternative port sub that allows casing pressure tests to be conducted without any concern of inadvertently opening flow ports during the testing.

SUMMARY

According to a broad aspect of the present disclosure, there is provided a port assembly usable in a port sub having a wall with an inner surface defining an inner bore, an outer surface, and a flow port defined in the wall and extending between the inner surface and the outer surface, the port assembly comprising: a burst disk for placement adjacent to the inner surface and having a burst disk outer surface facing away from the inner bore; a dissolvable barrier adjacent to but spaced apart from the burst disk outer surface to define a cavity therebetween, wherein the port assembly is positionable tangentially in the port sub such that a center of the port assembly is laterally offset by a distance from a center line of the port sub, wherein at least a portion of the port assembly is positionable in the flow port to block fluid flow therethrough when the burst disk and dissolvable barrier are intact, and when the burst disk is ruptured and the dissolvable barrier is broken through, fluid is permitted to flow through the ruptured burst disk and broken dissolvable barrier, and wherein the dissolvable barrier is configured to be broken through after the burst disk is ruptured and after a breakthrough time has lapsed.

According to another broad aspect of the present disclosure, there is provided a port assembly usable in a port sub having a wall with an inner surface defining an inner bore, an outer surface, and a flow port defined in the wall and extending between the inner surface and the outer surface, the port assembly comprising: a burst disk for placement adjacent to the inner surface and having a burst disk outer surface facing away from the inner bore; a dissolvable barrier adjacent to but spaced apart from the burst disk outer surface to define a cavity therebetween, the dissolvable barrier having one or more thinner areas, wherein at least a portion of the port assembly is positionable in the flow port to block fluid flow therethrough when the burst disk and dissolvable barrier are intact, and when the burst disk is ruptured and the dissolvable barrier is broken through, fluid is permitted to flow through the ruptured burst disk and broken dissolvable barrier, and wherein the dissolvable barrier is configured to be broken through after the burst disk is ruptured and after a breakthrough time has lapsed.

According to another broad aspect of the present disclosure, there is provided a port sub connectable to a downhole tubular, the port sub comprising: a wall defining an inner bore and having a flow port extending therethrough; and a port assembly partially or wholly positioned in the flow port, the port assembly comprising a burst disk adjacent the inner bore and a dissolvable barrier spaced apart from the burst disk to define a cavity therebetween and positioned further away from the inner bore than the burst disk, wherein, when the burst disk and dissolvable barrier are intact, the burst disk and the dissolvable barrier block fluid flow through the flow port, wherein, when the burst disk is ruptured and dissolvable barrier is broken through, the ruptured burst disk and broken dissolvable barrier provide a flow passage to permit fluid flow therethrough, the flow passage being tangentially positioned relative to the port sub such that a center of the port assembly is laterally offset by a distance from a center line of the port sub, and wherein the dissolvable barrier is configured to be broken through after the burst disk is ruptured and after a breakthrough time has lapsed.

According to another broad aspect of the present disclosure, there is provided a port sub connectable to a downhole tubular, the port sub comprising: a wall defining an inner bore and having a flow port extending therethrough; and a port assembly partially or wholly positioned in the flow port, the port assembly comprising a burst disk adjacent the inner bore and a dissolvable barrier spaced apart from the burst disk to define a cavity therebetween and positioned further away from the inner bore than the burst disk, the dissolvable barrier having one or more thinner areas, wherein, when the burst disk and dissolvable barrier are intact, the burst disk and the dissolvable barrier block fluid flow through the flow port, wherein, when the burst disk is ruptured and dissolvable barrier is broken through, the ruptured burst disk and broken dissolvable barrier provide a flow passage to permit fluid flow therethrough, and wherein the dissolvable barrier is configured to be broken through after the burst disk is ruptured and after a breakthrough time has lapsed.

In some embodiments, the port assembly comprises a protective layer adjacent to an outer surface of the dissolvable barrier.

In some embodiments, the protective layer comprises a second burst disk.

In some embodiments, the burst disk has a higher rupture pressure than the second burst disk.

In some embodiments, the protective layer comprises a dissolvable coating.

In some embodiments, the dissolvable coating comprises one or more of: a mastic, a rubber, steel, and stainless steel.

In some embodiments, the cavity comprises compressible fluid.

In some embodiments, the breakthrough time ranges from about 2 hours to about 100 hours.

In some embodiments, the dissolvable barrier is directly attached to the wall.

In some embodiments, the port assembly comprises a retainer member for securing the burst disk and dissolvable barrier to the wall.

In some embodiments, the port assembly comprises a corrosive material disposed in the cavity or embedded in the dissolvable barrier.

In some embodiments, the corrosive material comprises one or more of: sulfuric acid, anhydrous $H_2SO_4$, and anhydrous HF.

In some embodiments, the corrosive material is in a powder form or a pill form.

In some embodiments, the dissolvable barrier is a sleeve supported on an outer surface of the wall.

In some embodiments, the dissolvable barrier comprises one or more of: aluminum, aluminum alloy, aluminium, magnesium, magnesium alloy, zinc alloy, polylactic acid, polylactic acid copolymer, polyvinyl acetate, and polyvinyl acetate copolymer.

In some embodiments, the distance ranges between about 5% of an inner diameter of the port sub and about 5% of an outer diameter of the port sub.

According to another broad aspect of the present disclosure, there is provided a method for delaying opening of a flow port of a port sub, the flow port being blocked by a rupture disk and a dissolvable barrier, the method comprising: increasing a pressure of a fluid inside the port sub to rupture the burst disk; exposing, by rupturing the burst disk, the dissolvable barrier to the fluid; and dissolving, by exposure to the fluid, the dissolvable barrier to open a flow passage through the dissolvable barrier, the flow passage being tangentially positioned relative to the port sub.

In some embodiments, the opening of the flow passage occurs after a breakthrough time.

In some embodiments, the method comprises adjusting the breakthrough time by one or more of: modifying a thickness of the dissolvable barrier; providing one or more thinner areas in the dissolvable barrier; modifying a thickness of the one or more thinner areas; and increasing or decreasing the number of thinner areas.

According to another broad aspect of the present disclosure, there is provided a method for delaying opening of a flow port of a port sub, the flow port being blocked by a rupture disk and a dissolvable barrier, the method comprising: increasing a pressure of a fluid inside the port sub to rupture the burst disk; exposing, by rupturing the burst disk, the dissolvable barrier to the fluid; and dissolving, by exposure to the fluid, one or more thinner areas of the dissolvable barrier to open a flow passage through the dissolvable barrier.

In some embodiments, the method comprises adjusting the breakthrough time by one or more of: modifying a thickness of the dissolvable barrier; modifying a thickness of the one or more thinner areas; and increasing or decreasing the number of thinner areas.

In some embodiments, the method comprises dissolving or rupturing a protective layer adjacent to the dissolvable barrier.

In some embodiments, the protective layer is a second rupture disk.

In some embodiments, the second rupture disk has a rupture pressure less than that of the burst disk.

In some embodiments, the port sub is connected to a downhole tubular and the burst disk has a rupture pressure of about 80% to about 100% of a yield pressure of the downhole tubular.

In some embodiments, the method comprises positioning the port sub at or near a toe of the wellbore.

The details of one or more embodiments are set forth in the description below. Other features and advantages will be apparent from the specification and the claims.

BRIEF DESCRIPTION OF THE DRAWINGS

The invention will now be described by way of an exemplary embodiment with reference to the accompanying simplified, diagrammatic, not-to-scale drawings. Any dimensions provided in the drawings are provided only for illustrative purposes, and do not limit the invention as defined by the claims. In the drawings:

DETAILED DESCRIPTION OF THE EMBODIMENTS

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the scope of the invention, as defined in the appended claims.

According to embodiments herein, there is provided a port sub having one or more flow ports, each flow port having a respective port assembly for controlling fluid flow therethrough. In some embodiments, the port assembly is tangentially positioned in the port sub. Each port assembly generally comprises a burst disk, a dissolvable barrier, and optionally a protective layer. In some embodiments, the configuration of the dissolvable barrier is selected to allow the barrier to disintegrate within a predetermined time period in order to selectively control when the corresponding flow port opens. The port assembly has an intact position, a dissolve position, and an open position. In the intact position, the components of the port assembly are intact to block the flow port such that no fluid can flow therethrough. In the dissolve position, the burst disk has ruptured, and the dissolvable barrier is exposed to fluids inside the port sub and its disintegration process occurs. In the open position, at least part of the dissolvable barrier has disintegrated and the protective layer is broken to provide a flow passage through which fluid can flow, thereby opening the flow port.

Figure 1:
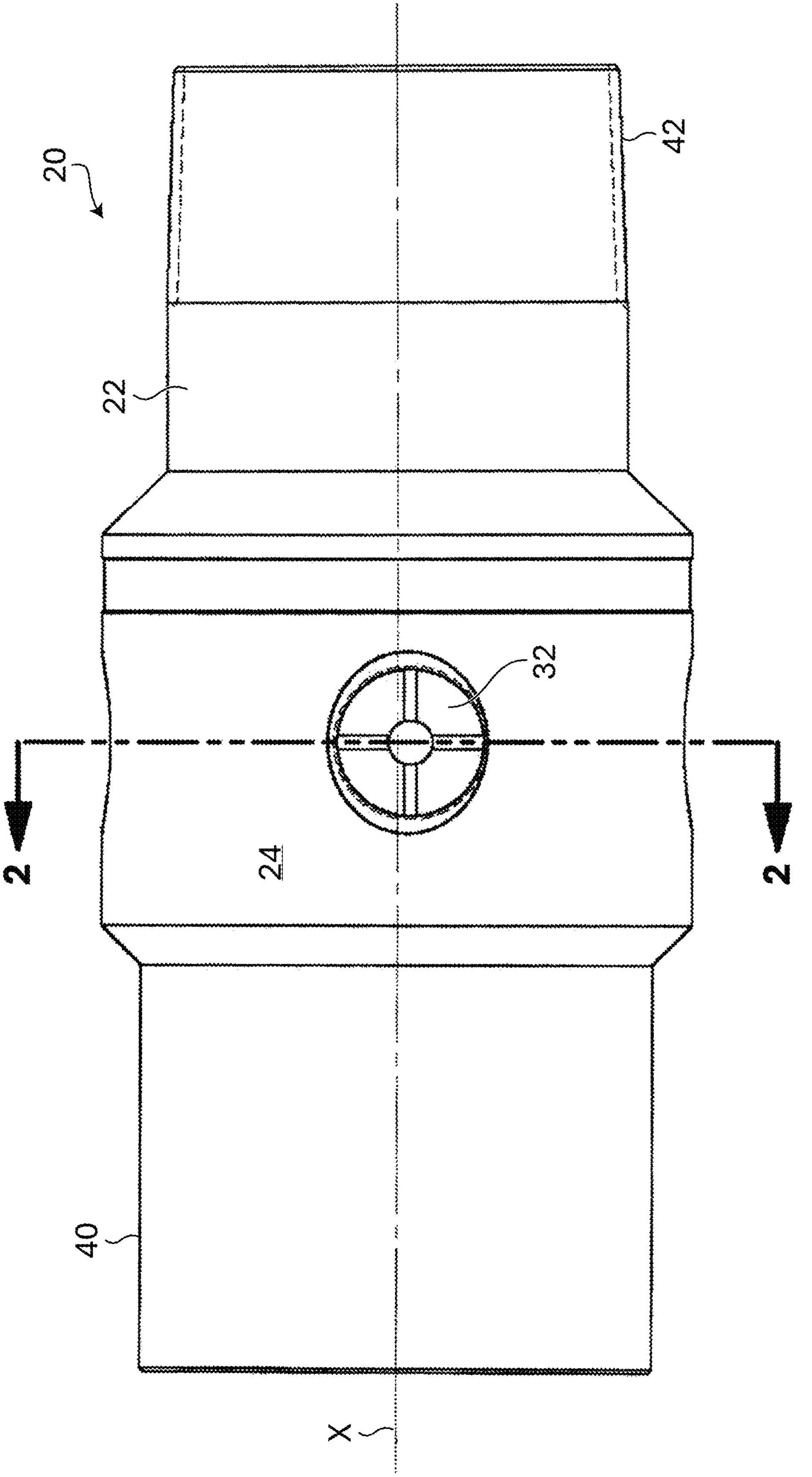
FIG. 1 is a side plan view of a port sub according to one embodiment of the present disclosure.
Figure 2:
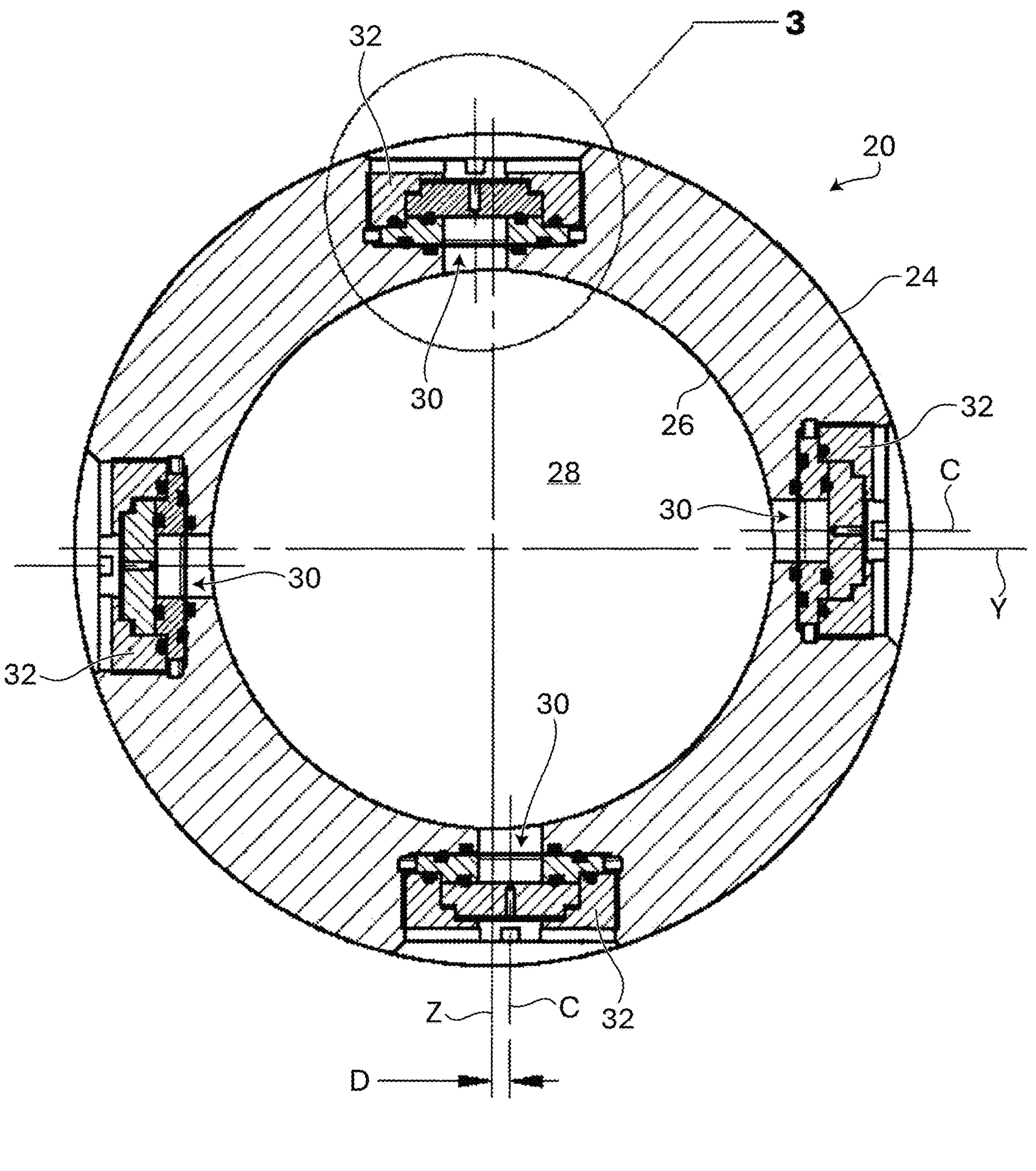
FIG. 2 is a cross-sectional view of the port sub shown in FIG. 1, taken along line A-A.

With reference to FIGS. 1 and 2, a port sub 20 comprises a tubular wall 22 having an outer surface 24 and an inner surface 26. Inner surface 26 defines an inner axial bore 28. The wall 22 has one or more flow ports 30, each extending between the inner surface 26 and the outer surface 24 to allow fluid communication between the inner bore 28 and the space external to the port sub. Each of the flow ports 30 has a respective port assembly 32 positioned therein. The port assembly 32 may be wholly or partially disposed in the flow port 30. In some embodiments, the port assembly 32 is positioned within wall 22, between the outer surface 24 and inner surface 26. In other embodiments, at least a portion of the port assembly extends beyond the inner surface 26 and/or outer surface 24 of the wall 22. The port assembly 32 is configured to control the opening of its corresponding flow port 30 as described in detail below.

In some embodiments, the port sub 20 may have an inner diameter in a range of about 1" and about 10" and an outer diameter in a range of about 3" and about 12". In some embodiments, the wall 22 may have a thickness in a range of about 1" and 4". In some embodiments, the flow port 30 may have a diameter in a range of about 0.25" and 1".

In some embodiments, the port assembly 32 is configured such that, when it is positioned in the port 30, the center of the flow passage provided in the port assembly 32, when the port assembly is in the open position, is slightly off-centered relative to the port 30 and/or one or more center lines of the port sub 20. In some embodiments, as illustrated in FIGS. 1 and 2, the center of the flow passage in port assembly 32, denoted by the center line "C" is laterally offset from: center line x and/or center line y; or center line x and/or center line z of the port sub, by a distance D. The center of the port assembly flow passage does not align with at least one of center lines x, y, and z of the port sub 20. In some embodiments, distance D may range from about 5% of the inner diameter of the port sub to about 5% of the outer diameter of the port sub. Because of this lateral offset, the port assembly 32 is referred to as being "tangentially" positioned in the port sub, rather than "radially" positioned where the center of the port assembly flow passage aligns with the center lines of the port sub. In some embodiments, the flow port 30 itself is tangentially positioned relative to one or more of the center lines of the port sub 20 such that when port assembly 32 is positioned in flow port 30 and centered thereto, port assembly 32 is also tangentially positioned in the port sub 20. Therefore, where the center of the flow passage in the port assembly 32 is laterally offset from one or more of the center lines of the port sub 20, the port assembly 32 is considered tangentially positioned relative to the port sub, regardless of whether the corresponding flow port 30 itself is centered or off-centered relative to the port sub.

While the illustrated port sub 20 has four flow ports 30, each having positioned therein a respective port assembly 32, the port sub 20 may have fewer and more flow ports and port assemblies in other embodiments.

With reference to FIG. 1, the port sub 20 has a first end 40 and a second end 42, for connection with downhole tubulars such that port sub 20 is part of at least one of: a downhole tubing (e.g., a production tubing), a liner, and a casing in the wellbore. Accordingly, port sub 20 may be used in an open hole or cement application. In some embodiments, the first and second ends 40,42 may be internally or externally threaded for connection with the tubing, liner, and/or casing.

In some embodiments, the port sub 20 may be integrated with the tubing, liner, or casing such that the port sub 20 forms a portion thereof. In other embodiments, the port sub 20 is supported circumferentially on the outer surface of the tubing, liner, or casing. In alternative embodiments, the port sub is positioned in the inner bore of the tubing, liner, or casing. In some embodiments, the inner bore 28 of the port sub 20 is in fluid communication with the inner bore of the tubing, liner, or casing.

In some embodiments, two or more port subs 20 are part of the tubing, liner, or casing. In some embodiments, a port sub 20, as part of the tubing, liner, or casing, is positioned at or near the toe of the wellbore and such a port sub is sometimes referred to herein as a "toe sub".

In some embodiments, the port sub 20 is positioned in an area of a reservoir in a subterranean formation. The subterranean reservoir may contain hydrocarbons, such as oil, gas, and the like.

Figure 3:
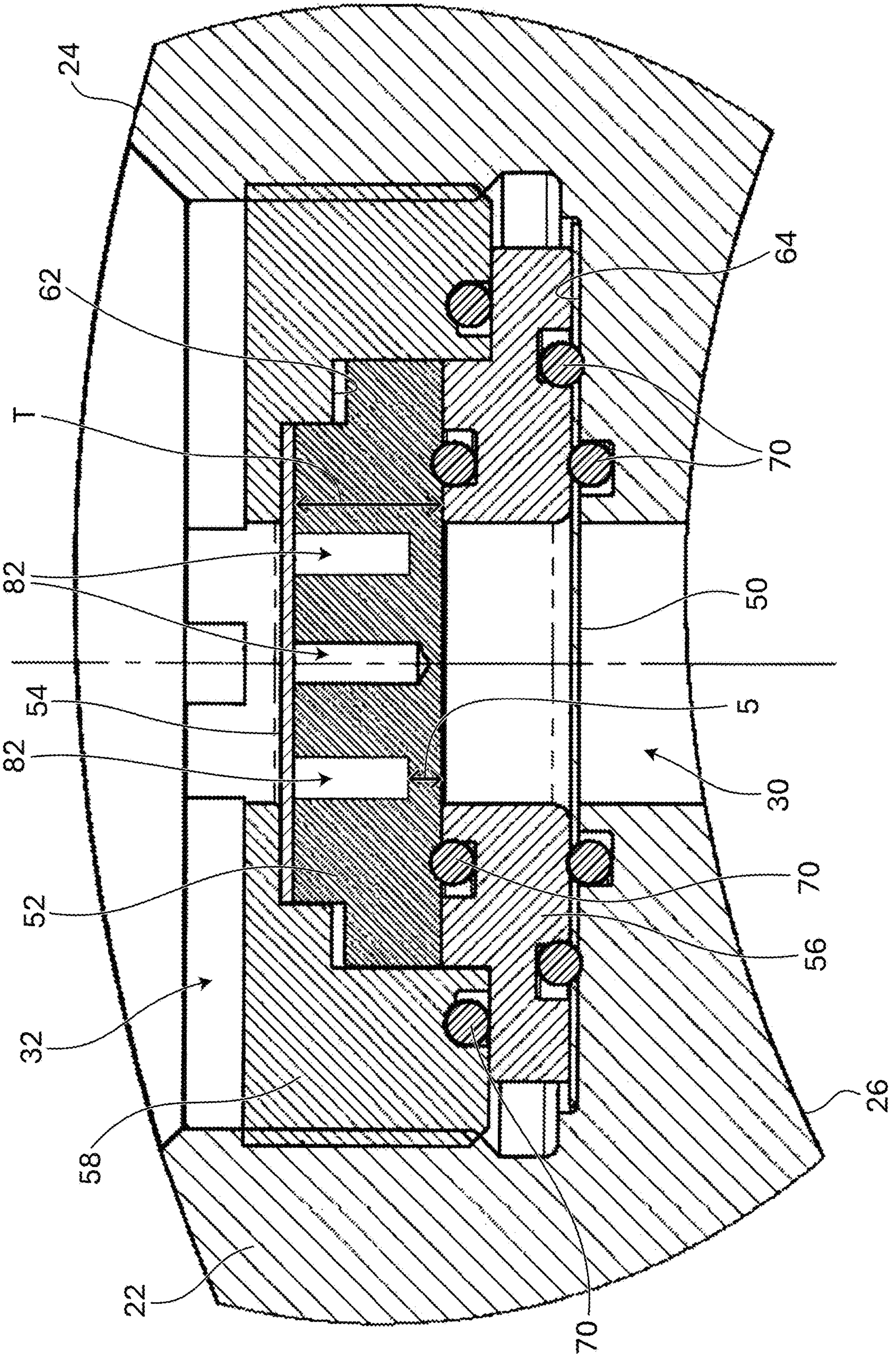
FIG. 3 is a detailed view of area "B" of FIG. 2, showing a port assembly of the port sub.

According to one embodiment, FIG. 3 shows a port assembly 32 usable for controlling the opening of a flow port 30 of port sub 20. In FIG. 3, the port assembly 32 is shown in an intact position. Port assembly 32 comprises a burst disk 50 (sometimes referred to as "inner burst disk"), a dissolvable barrier 52, and a protective layer 54. In some embodiments, the protective layer 54 is a second burst disk (sometimes referred to as "outer burst disk"). In other embodiments, the protective layer 54 is a dissolvable coating. In further embodiments, the protective layer 54 may be a combination of one or more burst disks and/or one or more dissolvable coatings. Whatever the form of protective layer 54, the protective layer 54 is configured to rupture and/or disintegrate without leaving debris in the wellbore that could block flow paths and impeded production of the subterranean formation. Unlike prior art "caps," the protective layer 54 is not displaced into the wellbore.

The port assembly 32 is positioned in the wall 22 of the port sub such that the burst disk 50 is adjacent to the inner surface 26 and the protective layer 54 is adjacent to the outer surface 24. The dissolvable barrier 52 is disposed between the burst disk 50 and the protective layer 54. In some embodiments, the dissolvable barrier 52 and protective layer 54 shield the burst disk 50 from fluid pressures outside the port sub. In some embodiments, the port assembly 32 is secured to the wall 22 of the port sub by threaded connection.

The protective layer 54 protects the dissolvable barrier 52 from being exposed to fluids external to the port sub 20, such as wellbore fluids, to prevent premature disintegration of the dissolvable barrier 52 at its outer surface. While the protective layer 54 is shown in some of the illustrated embodiments to abut against the dissolvable barrier 52, in other embodiments there may be some space between the protective layer 54 and dissolvable barrier 52 such that a second cavity is defined therebetween in the port assembly 32. In some embodiments, protective layer 54 may be omitted where the outer surface of the dissolvable barrier 52 is not exposed to wellbore fluids when the port assembly 32 is in the intact position. For example, in some embodiments, the port sub is meant to be installed inside a downhole tubular, shielded from external wellbore fluids, and the protective layer 54 may not be necessary.

In the illustrated embodiment, a spacer member 56 is positioned between the dissolvable barrier 52 and the burst disk 50 to separate the inner surface of the dissolvable barrier 52 and the outer surface of the burst disk 50, thereby defining a cavity 60 therebetween. In some embodiments, the spacer member 56 is an annular ring. In some embodiments, cavity 60 contains a compressible fluid. The cavity 60 provides a space for the burst disk 50 to expand into while the burst disk ruptures.

In some embodiments, the port assembly 32 comprises a retainer member 58 for securing the protective layer 54, the dissolvable barrier 52, the spacer member 56, and the burst disk 50 in the wall 22 of the port sub. In the illustrated embodiment, the retainer member 58 has one or more inner shoulders 62 for restricting the outward movement of the protective layer and the dissolvable barrier in order to prevent the dissolvable barrier from being dislodged from the flow port 30 when the port assembly 32 is in the intact position. In some embodiments, the retainer member 58 is externally threaded such that the port assembly 32 can be inserted into the flow port 30 and secured to the wall 22 by threaded connection.

In the illustrated embodiment, the wall 22 has outward-facing shoulders 64 for supporting the port assembly 32 when the port assembly 32 is disposed in flow port 30. When the port assembly 32 is placed in flow port 30, a portion of the inner surface of the burst disk 50 abuts against the shoulders 64, such that the inward movement of the port assembly 32 is restricted.

One or more of the interfaces in the port sub, for example, between: the burst disk 50 and the wall 22; the spacer member 56 and the bust disk 50; the spacer member 56 and the dissolvable barrier 52; and the spacer member 56 and the retainer member 58 may be fluidly sealed by one or more seals 70. Seal 70 may be an O-ring or any other types of seals known to those skilled in the art may also be used.

Referring to FIG. 3, the dissolvable barrier 52 has an overall thickness, i.e., the distance between its outer surface and its inner surface, which is denoted by the reference character "T". In some embodiments, thickness T is about ¼". In other embodiments, thickness T ranges between about 1/16" and about ⅜".

Figure 6:
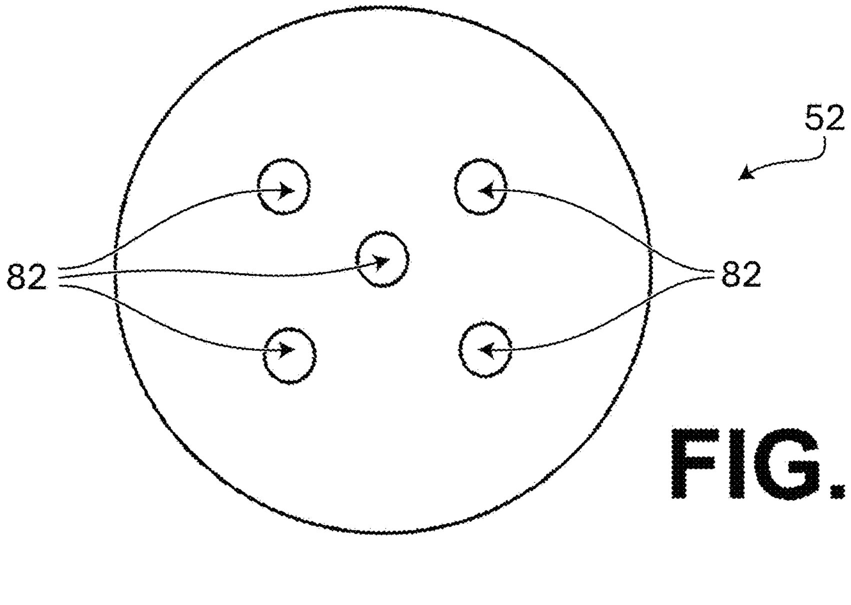
FIG. 6 is a top plan view of a dissolvable barrier according to another embodiment of the present disclosure.

In some embodiments, the dissolvable barrier 52 has one or more areas that have less thickness than the overall thickness T. Such areas are referred to as "thinner areas". For example, as illustrated in FIGS. 3 and 6, the dissolvable barrier 52 comprises one or more holes 82. While FIG. 6 shows the dissolvable barrier 52 as having five holes 82, the dissolvable barrier 52 may have fewer or more holes 82 in other embodiments. In some embodiments, a first end of each hole 82 is at or near the outer surface of the dissolvable barrier. Each hole 82 has a length less than the thickness T of the dissolvable barrier such that the holes 82 do not extend fully to the inner surface of the dissolvable barrier 52. As a result, there is at least some thickness of dissolvable material of the dissolvable barrier adjacent a second end of each hole 82. As one skilled in the art can appreciate, the presence of the holes 82 is one of many possible ways to provide areas of less thickness (i.e., "thinner areas") in the dissolvable barrier 52, which in the illustrated embodiment are the areas adjacent the second ends of the holes 82. The thinner areas generally disintegrate quicker than the surrounding thicker areas of the dissolvable barrier 52. The thickness of these thinner areas is denoted by the reference character "S" in FIG. 3. The thickness S of dissolvable material in the thinner areas may be the same or different for two or more of the areas. The thickness S does not necessarily have to be the same for all the thinner areas. Thickness S may range from 1% to 99% of the thickness T.

The "breakthrough" time of the dissolvable barrier 52, i.e. the time it takes for the fluid from the inner bore 28 of the port sub to dissolve the dissolvable barrier enough to flow therethrough after the dissolvable barrier is first exposed to the fluid, depends on the configuration of the dissolvable barrier, the material of the dissolvable barrier, the composition of the fluid in inner bore 28, and the temperature in the wellbore. The configuration of the dissolvable barrier refers to: the overall thickness T of the dissolvable barrier; the thickness S of the thinner areas if the dissolvable barrier has one or more thinner areas; and/or the number of thinner areas. The breakthrough time of the dissolvable barrier 52 can be preselected by using a dissolvable barrier of a specific thickness T and/or with a specific number of thinner areas each having a thickness S less than thickness T. In some embodiments, the breakthrough time is selected to be between about 2 hours and about 100 hours from the time the dissolvable barrier 52 is initially exposed to the fluid from inner bore 28.

Figure 4:
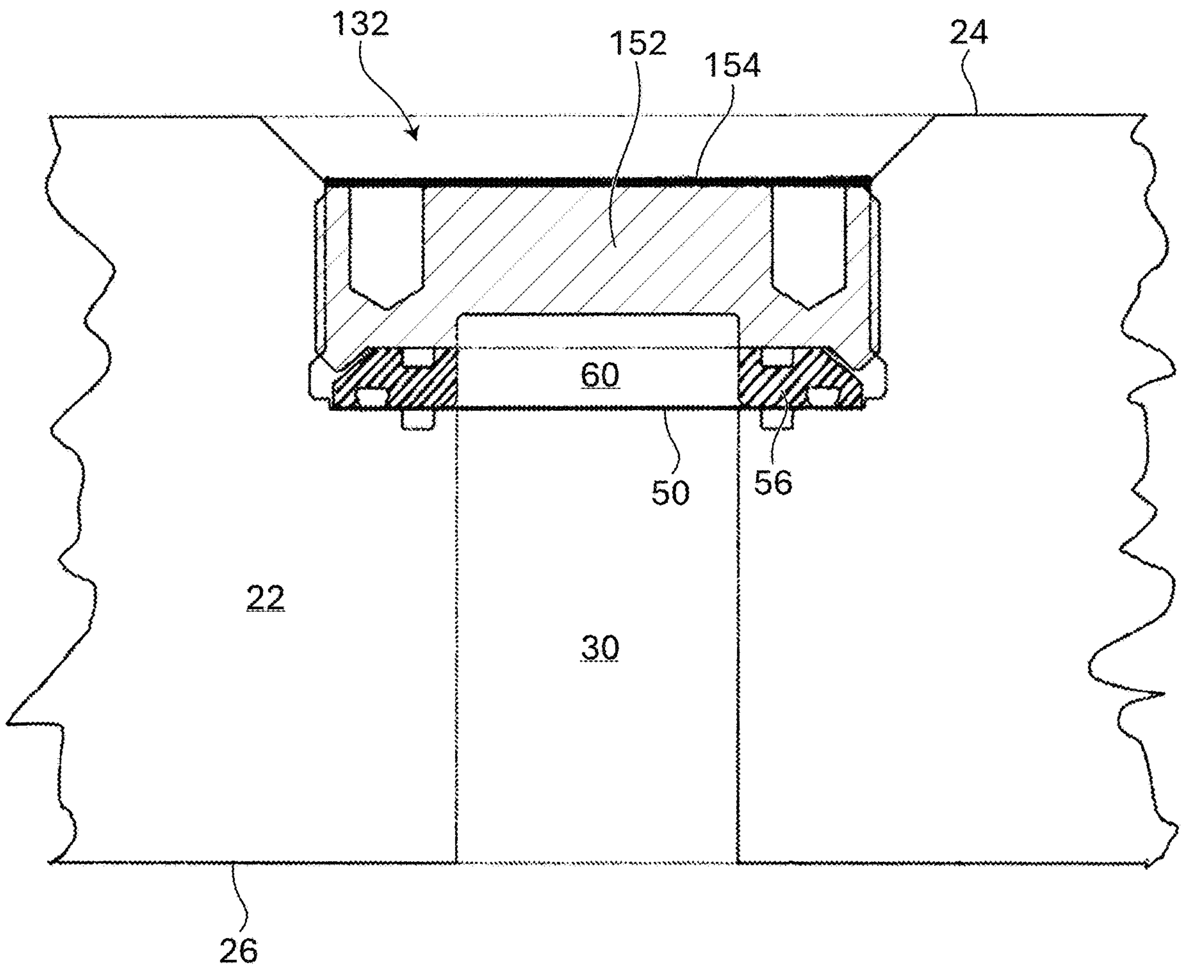
FIG. 4 is a cross-sectional view of a port assembly according to another embodiment of the present disclosure.

FIG. 4 shows a port assembly 132 usable in a flow port 30 of the port sub 20 accordingly to another embodiment. The port assembly 132 is shown in an intact position. The port assembly 132 has similar components as the port assembly 32, as described above with respect to FIG. 3, except the retainer member is omitted. In this embodiment, the port assembly 132 comprises an alternative dissolvable barrier 152 and protective layer 154. The protective layer 154 is attached to the outer surface of dissolvable barrier 152. The dissolvable barrier 152 is configured to allow itself to be secured directly to wall 22 such that the retainer member can be omitted. In the sample embodiment shown in FIG. 4, the dissolvable barrier 152 is externally threaded to allow a direct threaded connection with the wall 22, thereby securing itself and the spacer member 56 and burst disk 50 in the flow port 30. In an alternative or additional embodiment, the wall 22 may comprise inward-facing shoulders (not shown) for retaining the port assembly 132, to restrict the outward movement thereof, within flow port 30.

Figure 5:
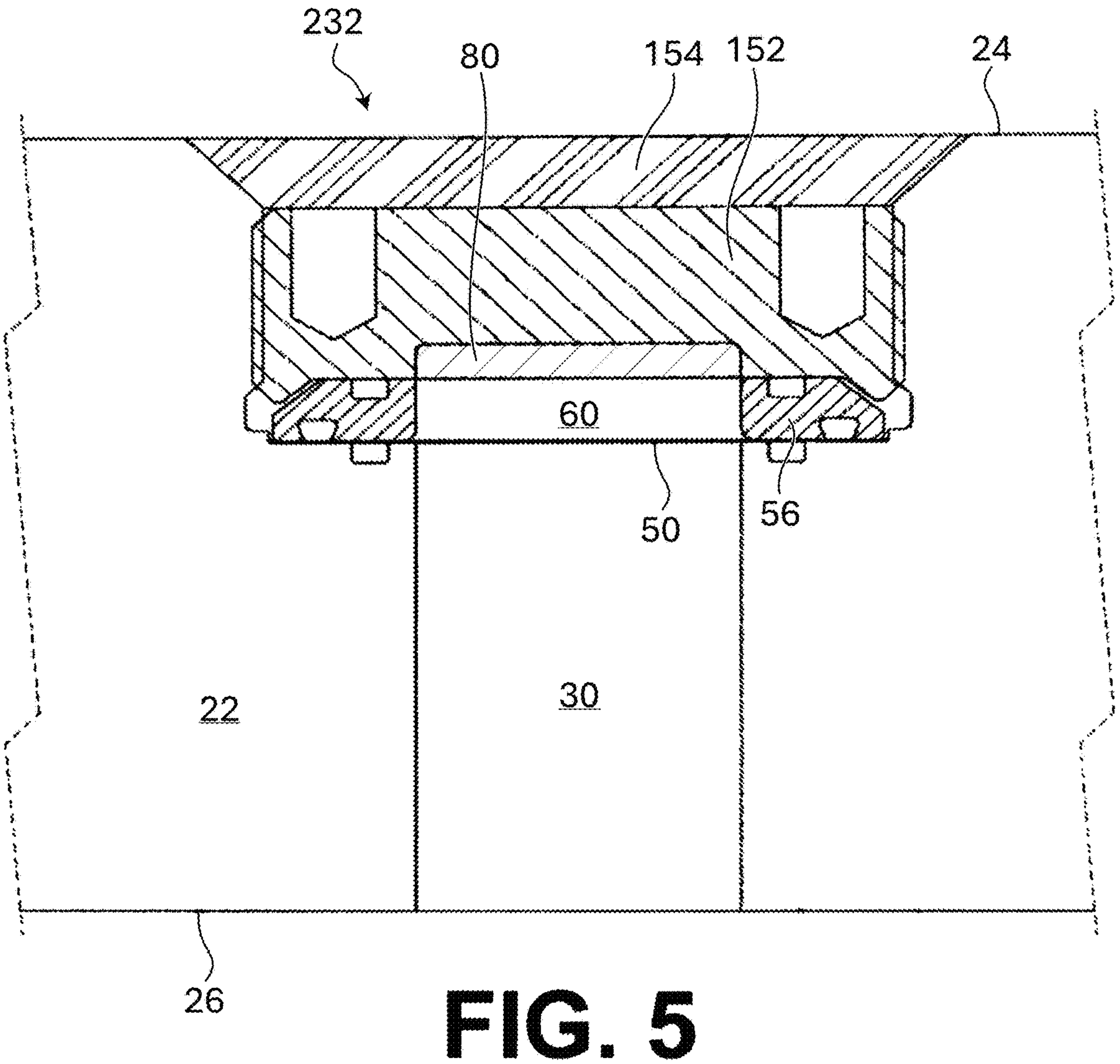
FIG. 5 is a cross-sectional view of a port assembly according to another embodiment of the present disclosure.

FIG. 5 shows a port assembly 232 usable in a flow port 30 of the port sub 30 according to another embodiment. The port assembly 232 is shown in an intact position. The port assembly 232 has similar components as the port assembly 132, as described above with respect to FIG. 4. In this embodiment, an amount of dehydrated corrosive material 80 is disposed in cavity 60 or is embedded in dissolvable barrier 152. The dehydrated corrosive material 80 is for accelerating the disintegration of the dissolvable barrier 152 when the corrosive material 80 is exposed to the fluid from inner bore 28. The corrosive material 80 may, for example, be sulfuric acid, anhydrous $H_2SO_4$, anhydrous HF, and/or any corrosive materials known to a person skilled in the art and may be in powder form or pill form as shown in FIG. 5.

Figure 7:
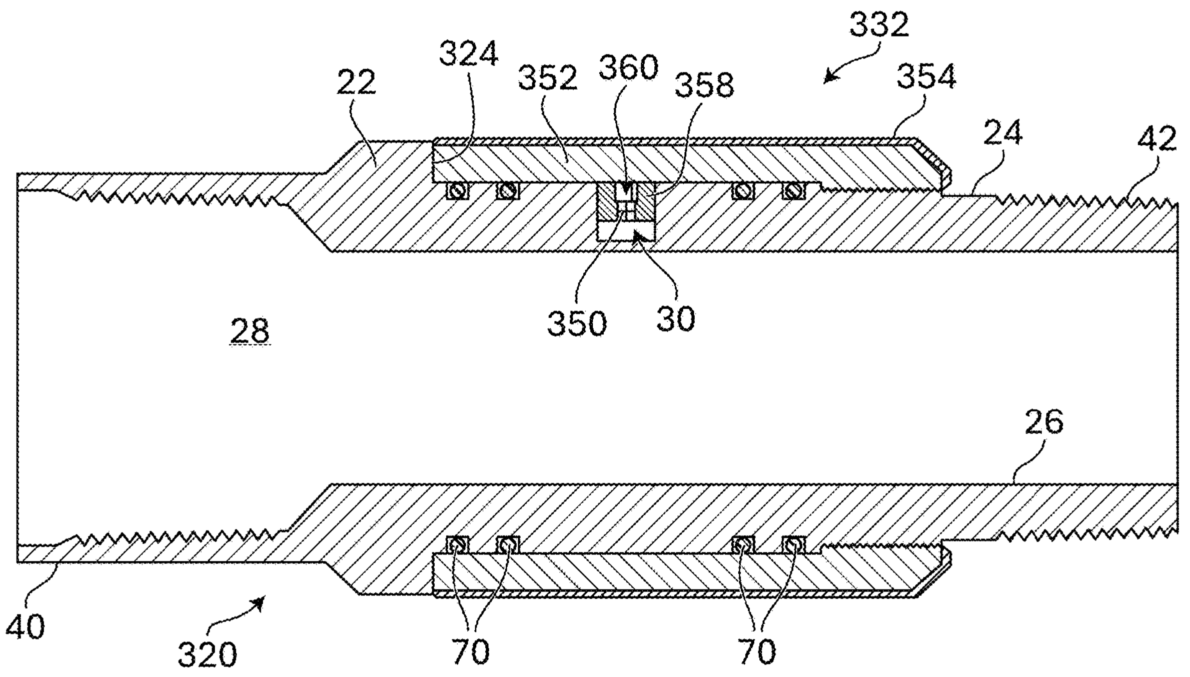
FIG. 7 is a cross-sectional view of a port sub according to another embodiment of the present disclosure.

FIG. 7 shows a port sub 320 having a port assembly 332 according to another embodiment. The port assembly 332 is shown in an intact position. In this embodiment, a portion of the port assembly 332 is supported on the outer surface 24 of the port sub 320 and the remaining portion is inside flow port 30. The port assembly 332 comprises a burst disk plug 358, each containing a burst disk 350, and a dissolvable barrier 352 covered by a protective layer 354. The burst disk plug 358 has an inner flow passage that is fluidly sealed by the burst disk 350 from the inner bore 28 of the port sub 320 when the port assembly 332 is in the intact position. A cavity 360 is defined between the inner surface of flow passage of the plug 358, the inner surface of the dissolvable barrier 352 and the burst disk 350. In some embodiments, the center of the flow passage of the burst disk plug 358 and/or the flow port 30 may be laterally offset from one or more center lines of the port sub 320 such that the flow passage is tangentially positioned in the wall 22 of the port sub 320, similar to that of the port assembly 32 as described above with respect to FIGS. 1 and 2.

In the illustrated embodiment shown in FIG. 7, the dissolvable barrier 352 is in the form of a sleeve supported on the outer surface 24. A first shoulder 324 is defined on outer surface 24 for abutting against a first end of the dissolvable barrier sleeve 352. The protective layer 354 seals the dissolvable barrier 352 from wellbore fluids external to the port sub 320 to prevent the dissolvable barrier 253 from disintegrating prematurely at its outer surface. The port assembly 332 may further comprise one or more seals 70, which, for example, includes O-rings, for fluidly sealing the interface between the inner surface of the dissolvable barrier 352 and the outer surface 24 of the port sub 320.

Figure 8:
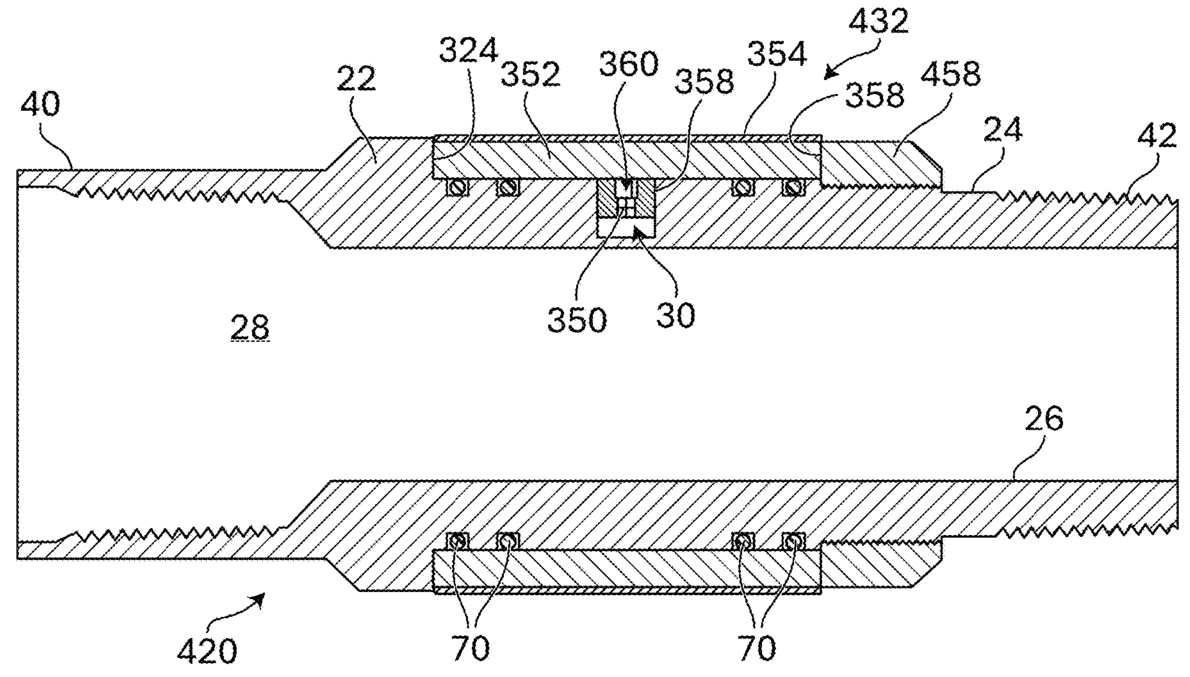
FIG. 8 is a cross-sectional view of a port sub according to another embodiment of the present disclosure.

FIG. 8 shows a port sub 420 having a port assembly 432 according to another embodiment. The port assembly 432 is shown in an intact position. Port sub 420 and port assembly 432 have all the components of port sub 320 and port assembly 332, respectively, as described above with respect to FIG. 7. In this embodiment, port sub 420 further comprises a nut 458, providing a second shoulder 358 for abutting against a second end of the dissolvable barrier sleeve 352, for securing same on the outer surface 24 of the port sub 420.

The dissolvable barrier is configured to dissolve when exposed to fluid from inner bore of the port sub and may comprise one or more of: aluminum, aluminum alloy, aluminium, magnesium, magnesium alloy, zinc alloy, polylactic acid, polylactic acid copolymer, polyvinyl acetate, polyvinyl acetate copolymer, and other suitable materials as known to those skilled in the art. The material of the dissolvable barrier may be selected to dissolve in acid(s) and/or fluid(s) containing salt(s). The material of the dissolvable barrier may further fulfill some requirements for material strength, in addition to the requirement(s) for dissolvability or solubility. Where the protective layer is a dissolvable coating configured to dissolve in the presence of fluid in the inner bore of the port sub, the dissolvable coating may comprise one or more of a mastic, rubber, steel, stainless steel, and other suitable material as known to those skilled in the art.

A burst disk is designed to withstand pressures up to a predetermined pressure ("rupture pressure") and to rupture when the pressure it is exposed to reaches the rupture pressure. In some embodiments, where the protective layer is a second burst disk, the inner burst disk is selected to have a higher rupture pressure than the second (outer) burst disk. For example, the inner burst disk may have a rupture pressure of about 8,000 psi while the rupture pressure of the outer burst disk is about 80 psi. Accordingly, in some embodiments, less pressure is required to rupture the outer burst disk than the inner burst disk.

The rupture pressure of the inner burst disk is the sum of the maximum hydrostatic pressure, the maximum pressure expected during the cement plug test (i.e., bumping the plug), and a safety margin to account for water hammer effects, gauge accuracy, and operator error. The port subs of the present disclosure are configured taking into account the hydrostatic pressure of the cement blend such that the inner burst disk does not rupture during cementing operations.

The (inner) burst disk is selected to rupture during the casing integrity pressure test. Once ruptured, fluid in the inner bore 28 of the port sub can flow into the cavity via the ruptured burst disk to reach the dissolvable barrier to start disintegrating same.

In operation, a port sub, having a flow port and a port assembly positioned therein, is connected to or is a part of a tubular that is run into a wellbore. The port assembly is initially in the intact position and may be tangentially positioned relative to the port sub. After running in, the tubular may or may not be cemented to the wellbore. In some embodiments, the port sub is positioned at the toe end of the tubular such that the port sub is at or near the toe of the wellbore.

Once the port sub is in place, fluid is pumped down the inner bore of the tubular and the pressure inside the tubular and the port sub is increased. In the case of a casing pressure test, the pressure inside the tubular is increased to at least the test pressure. Once the (inner) burst disk of the port assembly bursts as a result of the increased pressure inside the port sub, the port assembly is in the dissolve position, wherein the dissolvable barrier is exposed to the fluid and its disintegration process occurs. The dissolvable barrier thus prevents the flow port of the port sub from becoming immediately opened when the burst disk is ruptured.

As discussed above, the breakthrough time of the dissolvable barrier depends on its configuration. In general, the breakthrough time of a dissolvable barrier with one or more thinner areas will be less than that of a dissolvable barrier without holes having the same thickness T.

Once the dissolvable barrier is broken through, the fluid reaches the protective layer. Where the protective layer is a dissolvable coating, the fluid dissolves the protective layer to fully open the flow passage of the port assembly, thereby allowing fluid communication between the inner bore 28 and the space external to the port sub via the flow port 30. When the flow passage of the port assembly is open, the port assembly is in the open position.

Where the protective layer is an outer burst disk, the outer burst disk may be selected to have a low rupture pressure such that it ruptures almost immediately upon exposure to the fluid from inner bore 28 or a high rupture pressure such that the opening of the port assembly flow passage may be further delayed if desired.

If the port assembly is tangentially positioned relative to the port sub, the fluid exiting the port sub via the opened flow passage of the port assembly may have a swirl spray pattern, as opposed to a random spray pattern of a fluid stream exiting a radial flow port. The swirl spray pattern provided by the tangentially positioned port assembly may help distribute fluid into the wellbore more evenly compared to a prior art radially positioned flow port.

Accordingly, the present disclosure provides a port assembly having a delayed opening sequence for use in a port sub to allow a downhole tubular having the port sub to be pressure tested without prematurely opening flow ports in the port sub.

According to a broad aspect, there is provided a port assembly usable in a port sub having a wall with an inner surface defining an inner bore, an outer surface, and a flow port defined in the wall and extending between the inner surface and the outer surface, the port assembly comprising:

- a burst disk for placement adjacent to the inner surface and having a burst disk outer surface facing away from the inner bore;
- a dissolvable barrier adjacent to but spaced apart from the burst disk outer surface to define a cavity therebetween,
- wherein the port assembly is positionable tangentially in the port sub such that a center of the port assembly is laterally offset by a distance from a center line of the port sub,
- wherein at least a portion of the port assembly is positionable in the flow port to block fluid flow therethrough when the burst disk and dissolvable barrier are intact, and when the burst disk is ruptured and the dissolvable barrier is broken through, fluid is permitted to flow through the ruptured burst disk and broken dissolvable barrier, and
- wherein the dissolvable barrier is configured to be broken through after the burst disk is ruptured and after a breakthrough time has lapsed.

According to another broad aspect, there is provided a port assembly usable in a port sub having a wall with an inner surface defining an inner bore, an outer surface, and a flow port defined in the wall and extending between the inner surface and the outer surface, the port assembly comprising:

- a burst disk for placement adjacent to the inner surface and having a burst disk outer surface facing away from the inner bore;
- a dissolvable barrier adjacent to but spaced apart from the burst disk outer surface to define a cavity therebetween, the dissolvable barrier having one or more thinner areas,
- wherein at least a portion of the port assembly is positionable in the flow port to block fluid flow therethrough when the burst disk and dissolvable barrier are intact, and when the burst disk is ruptured and the dissolvable barrier is broken through, fluid is permitted to flow through the ruptured burst disk and broken dissolvable barrier, and
- wherein the dissolvable barrier is configured to be broken through after the burst disk is ruptured and after a breakthrough time has lapsed.

In some embodiments, the port assembly comprises a protective layer adjacent to an outer surface of the dissolvable barrier.

In some embodiments, the protective layer comprises a second burst disk.

In some embodiments, the burst disk has a higher rupture pressure than the second burst disk.

In some embodiments, the protective layer comprises a dissolvable coating.

In some embodiments, the dissolvable coating comprises one or more of: a mastic, a rubber, steel, and stainless steel.

In some embodiments, the cavity comprises compressible fluid.

In some embodiments, the breakthrough time ranges from about 2 hours to about 100 hours.

In some embodiments, the dissolvable barrier is directly attachable to the wall.

In some embodiments, the port assembly comprises a retainer member for securing the burst disk and dissolvable barrier to the wall.

In some embodiments, the port assembly comprises a corrosive material disposed in the cavity or embedded in the dissolvable barrier.

In some embodiments, the corrosive material comprises one or more of: sulfuric acid, anhydrous $H_2SO_4$, and anhydrous HF.

In some embodiments, the corrosive material is in a powder form or a pill form.

In some embodiments, the dissolvable barrier is a sleeve supportable on the outer surface of the port sub.

In some embodiments, the dissolvable barrier comprises one or more of: aluminum, aluminum alloy, aluminium, magnesium, magnesium alloy, zinc alloy, polylactic acid, polylactic acid copolymer, polyvinyl acetate, and polyvinyl acetate copolymer.

In some embodiments, the distance ranges between about 5% of an inner diameter of the port sub and about 5% of an outer diameter of the port sub.

According to another broad aspect, there is provided a port sub connectable to a downhole tubular, the port sub comprising:

- a wall defining an inner bore and having a flow port extending therethrough; and
- a port assembly partially or wholly positioned in the flow port, the port assembly comprising a burst disk adjacent the inner bore and a dissolvable barrier spaced apart from the burst disk to define a cavity therebetween and positioned further away from the inner bore than the burst disk, wherein, when the burst disk and dissolvable barrier are intact, the burst disk and the dissolvable barrier block fluid flow through the flow port, wherein, when the burst disk is ruptured and dissolvable barrier is broken through, the ruptured burst disk and broken dissolvable barrier provide a flow passage to permit fluid flow therethrough, the flow passage being tangentially positioned relative to the port sub such that a center of the port assembly is laterally offset by a distance from a center line of the port sub, and wherein the dissolvable barrier is configured to be broken through after the burst disk is ruptured and after a breakthrough time has lapsed.

According to another broad aspect, there is provided a port sub connectable to a downhole tubular, the port sub comprising:

a wall defining an inner bore and having a flow port extending therethrough; and a port assembly partially or wholly positioned in the flow port, the port assembly comprising a burst disk adjacent the inner bore and a dissolvable barrier spaced apart from the burst disk to define a cavity therebetween and positioned further away from the inner bore than the burst disk, the dissolvable barrier having one or more thinner areas, wherein, when the burst disk and dissolvable barrier are intact, the burst disk and the dissolvable barrier block fluid flow through the flow port, wherein, when the burst disk is ruptured and dissolvable barrier is broken through, the ruptured burst disk and broken dissolvable barrier provide a flow passage to permit fluid flow therethrough, and wherein the dissolvable barrier is configured to be broken through after the burst disk is ruptured and after a breakthrough time has lapsed.

In some embodiments, the port assembly comprises a protective layer adjacent to an outer surface of the dissolvable barrier.

In some embodiments, the protective layer comprises a second burst disk.

In some embodiments, the burst disk has a higher rupture pressure than the second burst disk.

In some embodiments, the protective layer comprises a dissolvable coating.

In some embodiments, the dissolvable coating comprises one or more of: a mastic, a rubber, steel, and stainless steel.

In some embodiments, the cavity comprises compressible fluid.

In some embodiments, the breakthrough time ranges from about 2 hours to about 100 hours.

In some embodiments, the dissolvable barrier is directly attached to the wall.

In some embodiments, the port assembly comprises a retainer member and wherein the burst disk and dissolvable barrier are secured to the wall by the retainer member.

In some embodiments, the port assembly comprises a corrosive material disposed in the cavity or embedded in the dissolvable barrier.

In some embodiments, the corrosive material comprises one or more of: sulfuric acid, anhydrous $H_2SO_4$, and anhydrous HF.

In some embodiments, the corrosive material is in a powder form or a pill form.

In some embodiments, the dissolvable barrier is a sleeve supported on an outer surface of the wall.

In some embodiments, the dissolvable barrier comprises one or more of: aluminum, aluminum alloy, aluminium, magnesium, magnesium alloy, zinc alloy, polylactic acid, polylactic acid copolymer, polyvinyl acetate, and polyvinyl acetate copolymer.

In some embodiments, the distance ranges between about 5% of an inner diameter of the port sub and about 5% of an outer diameter of the port sub.

According to another broad aspect, there is provided a method for delaying opening of a flow port of a port sub, the flow port being blocked by a rupture disk and a dissolvable barrier, the method comprising:

increasing a pressure of a fluid inside the port sub to rupture the burst disk;

exposing, by rupturing the burst disk, the dissolvable barrier to the fluid; and dissolving, by exposure to the fluid, the dissolvable barrier to open a flow passage through the dissolvable barrier, the flow passage being tangentially positioned relative to the port sub.

In some embodiments, the opening of the flow passage occurs after a breakthrough time.

In some embodiments, the method comprises adjusting the breakthrough time by one or more of: modifying a thickness of the dissolvable barrier; providing one or more thinner areas in the dissolvable barrier; modifying a thickness of the one or more thinner areas; and increasing or decreasing the number of thinner areas.

According to another broad aspect, there is provided a method for delaying opening of a flow port of a port sub, the flow port being blocked by a rupture disk and a dissolvable barrier, the method comprising:

increasing a pressure of a fluid inside the port sub to rupture the burst disk;

exposing, by rupturing the burst disk, the dissolvable barrier to the fluid; and dissolving, by exposure to the fluid, one or more thinner areas of the dissolvable barrier to open a flow passage through the dissolvable barrier.

In some embodiments, the opening of the flow passage occurs after a breakthrough time.

In some embodiments, the method comprises adjusting the breakthrough time by one or more of: modifying a thickness of the dissolvable barrier; modifying a thickness of the one or more thinner areas; and increasing or decreasing the number of thinner areas.

In some embodiments, the method comprises dissolving or rupturing a protective layer adjacent to the dissolvable barrier.

In some embodiments, the protective layer is a second rupture disk.

In some embodiments, the second rupture disk has a rupture pressure less than that of the burst disk.

In some embodiments, the port sub is connected to a downhole tubular and the burst disk has a rupture pressure of about 80% to about 100% of a yield pressure of the downhole tubular.

In some embodiments, the method comprises positioning the port sub at or near a toe of the wellbore.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to"; "connected", "coupled", or any variant thereof, means any connection or coupling, either direct or indirect, between two or more elements; the coupling or connection between the elements can be physical, logical, or a combination thereof; "herein", "above", "below", and words of similar import, when used to describe this specification, shall refer to this specification as a whole, and not to any particular portions of this specification; "or", in reference to a list of two or more items, covers all of the following interpretations of the word: any of the items in the list, all of the items in the list, and any combination of the items in the list; the singular forms "a", "an", and "the" also include the meaning of any appropriate plural forms.

Where a component is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples but should be given the broadest interpretation consistent with the description as a whole.

What is claimed is:

1. A wellbore string, for emplacement within a wellbore for conducting fluid between a surface of the earth and a subterranean formation, comprising:

a port sub; and a conduit;

wherein:

the port sub is fluidly coupled to the conduit;

the port sub includes:

a housing;

a flow passage, defined within the housing;

a port, extending through the housing, from the flow passage to an environment external to the housing; and a sealing configuration, including;

a burst disk; and a dissolvable barrier;

wherein:

the port and the sealing configuration co-operate to establish a flow controller configuration that is characterized by a sealing-effective state and a sealing-ineffective state, wherein:

in the sealing-effective state, the port is sealed such that fluid communication, between the flow passage and the external environment, via the port, is prevented; and in the sealing-ineffective state, fluid communication, between the flow passage and the external environment, via the port, is established;

the flow controller configuration is configured in a first sealing-effective configuration, wherein, in the first sealing-effective configuration:

the burst disk establishes a first sealing interface between the flow passage and the external environment, such that the first sealing interface seals the port and prevents fluid communication, via the port, between the flow passage and the barrier, and the dissolvable barrier establishes a second sealing interface between the flow passage and the external environment such that the second sealing interface also seals the port and prevents fluid communication, via the port, between the external environment and the burst disk, such that the flow controller configuration is disposed in the sealing-effective state;

while the flow controller configuration is configured in the first sealing-effective configuration, the flow controller configuration is configurable in a second sealing-effective configuration, wherein, in the second sealing-effective configuration, the first sealing interface, established by the burst disk, is absent, such that the dissolvable barrier is disposed in fluid communication with the flow passage, and the second sealing interface, established by the dissolvable barrier, is effective, such that the flow controller configuration, is disposed in the sealing-effective state;

the first sealing interface, established by the burst disk, is defeatable in response to application of a respective seal-defeating fluid pressure and only if the seal-defeating fluid pressure is equal to, or greater than, a seal-defeating minimum predetermined pressure that is respective to the burst disk, wherein the defeating is with effect that the flow controller configuration transitions from the first sealing-effective configuration to the second sealing-effective configuration;

the fluid communication, in which the dissolvable barrier is disposed with the flow passage while the second sealing-effective state is established, is effective for emplacing a dissolution-stimulating material in a dissolution-effective communication with the dissolvable barrier for stimulating dissolution of the dissolvable barrier, with effect that the second sealing interface, established by the dissolvable barrier, is defeated; and the seal-defeating minimum predetermined fluid pressure, that is respective to the burst disk, is within a range, and the range is of from about 80% to about 100% of a yield pressure of the conduit.

2. The wellbore string of claim 1, wherein the defeating of the second sealing interface, established by the dissolvable barrier, is with effect that the flow controller configuration transitions from the second sealing-effective configuration to the sealing-ineffective configuration, such that the sealing-ineffective state is established.

3. The wellbore string of claim 2, wherein the defeating of the second sealing interface occurs after a breakthrough time that ranges from about 2 hours to 100 hours.

4. The wellbore string of claim 1, wherein:

the sealing configuration further includes a protective barrier, wherein the dissolvable barrier is disposed between the burst disk and the protective barrier;

while the flow controller configuration is configured in the first sealing-effective configuration:

the protective barrier establishes a third sealing interface between the flow passage and the external environment, such that the third sealing interface also seals the port, the third sealing interface, established by the protective barrier, is disposed between the external environment and the dissolvable barrier, such that fluid communication, via the port, between the external environment and the dissolvable barrier, is prevented by the third sealing interface;

while the flow controller configuration is configured in the second sealing-effective configuration, the second sealing interface, established by the dissolvable barrier, is effective, and the third sealing interface, established by the protective barrier, is effective;

the defeating of the second sealing interface, established by the dissolvable barrier, is with effect that the flow controller configuration transitions from the second sealing-effective configuration to a third sealing-effective configuration, and while the flow controller configuration is configured in the third sealing-effective configuration:

the first sealing interface, established by the burst disk, is absent, and the second sealing interface, established by the dissolvable barrier, is absent, such that protective barrier is disposed in fluid communication with the flow passage; and the third sealing interface, established by the protective barrier, is effective, such that the sealing-effective state, of the flow controller configuration, is effective; and defeating, of the third sealing interface, is with effect that the flow controller configuration transitions from the third sealing-effective configuration to the sealing-ineffective configuration.

5. The wellbore string of claim 4, wherein:

the third sealing interface, established by the protective barrier, is defeatable in response to application of a respective seal-defeating fluid pressure and only if the applied seal-defeating fluid pressure, that is respective to the sealing interface that is established by the protective barrier, is equal to, or greater than, a respective seal-defeating minimum predetermined pressure, wherein the transitioning of the flow controller configuration, from the third sealing-effective configuration to the sealing-ineffective configuration, is effected by the defeating; and the burst disk is a first burst disk and the protective barrier is a second burst disk, and the seal-defeating minimum predetermined pressure, that is respective to the first burst disk, is greater than the seal-defeating minimum predetermined pressure, that is respective to the second burst disk.

6. The wellbore string of claim 4, wherein the fluid communication, in which the protective barrier is disposed with the flow passage while the third sealing-effective state is established, is effective for emplacing a dissolution-stimulating material in a dissolution-effective communication with the protective barrier for stimulating dissolution of the protective barrier, with effect that the third sealing interface, established by the protective outer barrier, is defeated, wherein the transitioning of the flow controller configuration, from the third sealing-effective configuration to the sealing-ineffective configuration, is effected by the defeating.

7. The wellbore string of claim 1, wherein the dissolvable barrier is directly attached to a wall of the housing.

8. The wellbore string of claim 7, wherein:

the first sealing interface, established by the burst disk, is disposed within the port; and the second sealing interface, established by the dissolvable barrier, is disposed within the port.

9. The wellbore string of claim 1, wherein:

the port sub further includes a dissolution-stimulating material precursor configured for stimulation by a downhole fluid to produce a dissolution-stimulating material;

the dissolution-stimulating material precursor, the flow passage, and the dissolvable barrier are co-operatively configured such that, while the flow controller configuration is configured in the second sealing-effective configuration, and downhole fluid is disposed in the flow passage, the dissolution-stimulating material precursor is stimulated by the downhole fluid, with effect that the dissolution-stimulating material is produced and becomes emplaced in a dissolution-effective communication with the dissolvable barrier for stimulating dissolution of the dissolvable barrier, with effect that the second sealing interface, established by the dissolvable barrier, is defeated.

10. The wellbore string of claim 9, wherein while the flow controller configuration is disposed in the first sealing-effective state, the first sealing interface, established between the flow passage and the external environment, by the burst disk, is a sealing interface established between the flow passage and the dissolution-stimulating material precursor.

11. The wellbore string as claimed in claim 10, wherein the dissolution-stimulating precursor is a corrosive material.

12. The wellbore string as claimed in claim 11, wherein the corrosive material comprises sulfuric acid and/or HF.

13. The wellbore string as claimed in claim 9, wherein the dissolution-stimulating precursor is a corrosive material.

14. The wellbore string as claimed in claim 13, wherein the corrosive material comprises sulfuric acid and/or HF.

15. The wellbore string as claimed in claim 1, wherein the dissolvable barrier is spaced apart from the burst disk to define a cavity therebetween.

16. The wellbore string as claimed in claim 1, wherein:

the dissolvable barrier includes a plurality of thinner areas; and the defeating of the sealing interface, established by the dissolvable barrier, is with effect that the dissolvable barrier is perforated through at least one of the plurality of thinner areas.

17. The wellbore string as claimed in claim 1, wherein the dissolvable barrier is co-operable with the dissolution-stimulating material such that, in response to contacting of the dissolution-stimulating material with the dissolvable barrier, a reactive process is effected such that the dissolution includes a reactive process.

18. A method for delaying opening of a flow port of a port sub, the flow port being blocked by a rupture disk and a dissolvable barrier, the method comprising:

increasing a pressure of a fluid inside the port sub to rupture the first burst disk;

exposing, by rupturing the first burst disk, the dissolvable barrier to the fluid; and dissolving, by exposure to the fluid, at least a portion of the dissolvable barrier to open a flow passage through the dissolvable barrier, wherein the port sub is connected to a downhole tubular and the first burst disk has a rupture pressure of about 80% to about 100% of a yield pressure of the downhole tubular.

19. The method of claim 18, wherein the opening of the flow passage occurs after a breakthrough time.

20. The method of claim 19, further comprising adjusting the breakthrough time by one or more of: modifying a thickness of the dissolvable barrier;

modifying the dissolvable barrier to include a plurality of thinner areas; and when the dissolvable barrier includes a plurality of thinner areas, one or more of: modifying a thickness of at least one of the plurality of thinner areas, and increasing or decreasing the number of the plurality of thinner areas.

21. The method of claim 18, further comprising dissolving or rupturing a protective layer adjacent to the dissolvable barrier.

22. The method of claim 21, wherein the protective layer is a second burst disk.

23. The method of claim 22, wherein the second burst disk has a rupture pressure less than that of the first burst disk.

24. The method of 18, wherein the flow passage is tangentially positioned relative to the port sub.

25. The method of claim 18, further comprising positioning the port sub at or near a toe of the wellbore.

26. A port sub, comprising:

a housing;

a flow passage, defined within the housing;

a port, extending through the housing, from the flow passage to an environment external to the housing; and a sealing configuration, including;

a burst disk;

a dissolvable barrier;

a protective outer barrier;

wherein:

the dissolvable barrier is disposed between the burst disk and the protective outer barrier;

the port and the sealing configuration co-operate to establish a flow controller configuration that is characterized by a sealing-effective state and a sealing-ineffective state, wherein:

in the sealing-effective state, the port is sealed by the sealing configuration such that fluid communication, between the flow passage and the external environment, via the port, is prevented; and in the sealing-ineffective state, fluid communication, between the flow passage and the external environment, via the port, is established;

the flow controller configuration is configured in a first sealing-effective configuration, wherein, in the first sealing-effective configuration:

the burst disk establishes a first sealing interface between the flow passage and the external environment, such that the first sealing interface seals the port and prevents fluid communication, via the port, between the flow passage and the dissolvable barrier, the dissolvable barrier establishes a second sealing interface between the flow passage and the external environment such that the second sealing interface also seals the port, and the protective outer barrier establishes a third sealing interface between the flow passage and the external environment, such that the third sealing interface also seals the port and prevents fluid communication, via the port, between the external environment and the dissolvable barrier, such that the flow controller configuration is disposed in the sealing-effective state;

while the flow controller configuration is configured in the first sealing-effective configuration, the flow controller configuration is configurable in a second sealing-effective configuration, wherein, in the second sealing-effective configuration, the first sealing interface, established by the burst disk, is absent, such that the dissolvable barrier is disposed in fluid communication, via the port, with the flow passage, the second sealing interface, established by the dissolvable barrier, is effective, and the third sealing interface, established by the protective outer barrier, is effective, such that the flow controller configuration is disposed in the sealing-effective state;

the first sealing interface, established by the burst disk, is defeatable in response to application of a respective seal-defeating fluid pressure and only if the seal-defeating fluid pressure is equal to, or greater than, a seal-defeating minimum predetermined pressure that is respective to the burst disk, wherein the defeating is with effect that the flow controller configuration transitions from the first sealing-effective configuration to the second sealing-effective configuration;

the fluid communication, in which the dissolvable barrier is disposed with the flow passage while the second sealing-effective state is established, is effective for emplacing a dissolution-stimulating material in a dissolution-effective communication with the dissolution-stimulating material-responsive for stimulating dissolution of the dissolvable barrier, with effect that the second sealing interface, established by the dissolvable barrier, is defeated, such that the flow controller configuration transitions from the second sealing-effective configuration to a third sealing-effective configuration, and while the flow controller configuration is configured in the third sealing-effective configuration:

the first sealing interface, established by the burst disk, is absent, and the second sealing interface, established by the dissolvable barrier, is absent, such that protective outer barrier is disposed in fluid communication with the flow passage; and the third sealing interface, established by the protective outer barrier, is effective, such that the sealing-effective state, of the flow controller configuration, is effective; and the third sealing interface, established by the protective outer barrier, is defeatable in response to application of a respective seal-defeating fluid pressure and only if the applied seal-defeating fluid pressure, that is respective to the third sealing interface that is established by the protective outer barrier, is equal to, or greater than, a respective seal-defeating minimum predetermined pressure, wherein the defeating is with effect that the flow controller configuration transitions from the third sealing-effective configuration to the sealing-ineffective configuration;

and the burst disk is a first burst disk and the pressure-responsive outer barrier is a second burst disk and the seal-defeating minimum predetermined pressure, that is respective to the first burst disk, is greater than the seal-defeating minimum predetermined pressure, that is respective to the second burst disk.

27. The port sub as claimed in claim 26, wherein the dissolvable barrier is spaced apart from the first burst disk to define a cavity therebetween.

28. The port sub as claimed in claim 26, wherein:

the dissolvable barrier includes a plurality of thinner areas; and the defeating of the sealing interface, established by the dissolvable barrier, is with effect that the dissolvable barrier is perforated through at least one of the plurality of thinner areas.

29. The port sub as claimed in claim 26, wherein the dissolvable barrier is co-operable with the dissolution-stimulating material such that, in response to contacting of the dissolution-stimulating material with the dissolvable barrier, a reactive process is effected such that the dissolution includes a reactive process.

30. A port sub comprising:

a housing;

a flow passage, defined within the housing;

a port, extending through the housing, from the flow passage to an environment external to the housing;

a sealing configuration, including;

a burst disk; and a dissolvable barrier;

and a dissolution-stimulating material precursor configured for stimulation by a downhole fluid to produce a dissolution-stimulating material;

wherein:

the burst disk is disposed between the dissolvable barrier and the flow passage;

the dissolvable barrier is disposed between the burst disk and the external environment;

the dissolution-stimulating material precursor is disposed within the port;

the port and the sealing configuration co-operate to establish a flow controller configuration that is characterized by a sealing-effective state and a sealing-ineffective state, wherein:

in the sealing-effective state, the port is sealed such that fluid communication, between the flow passage and the external environment, via the port, is prevented; and in the sealing-ineffective state, fluid communication, between the flow passage and the external environment, via the port, is established;

the flow controller configuration is configured in a first sealing-effective configuration, wherein, in the first sealing-effective configuration:

the burst disk establishes a first sealing interface between the flow passage and the external environment, such that the first sealing interface seals the port and prevents fluid communication, via the port, between the flow passage and the dissolvable barrier, and the dissolvable barrier establishes a second sealing interface between the flow passage and the external environment such that the second sealing interface also seals the port and prevents fluid communication, via the port, between the external environment and the burst disk, such that the flow controller configuration is disposed in the sealing-effective state;

fluid communication between the flow passage and the dissolution-stimulating material precursor is prevented by the burst disk, and fluid communication between the external environment and the dissolution-stimulating material precursor is prevented by the dissolvable barrier;

while the flow controller configuration is configured in the first sealing-effective configuration:

the flow controller configuration is configurable in a second sealing-effective configuration, wherein, in the second sealing-effective configuration, the first sealing interface, established by the burst disk, is absent, such that the dissolution-stimulating material precursor is disposed in fluid communication with the flow passage, and the second sealing interface, established by the dissolvable barrier, is effective, such that the flow controller configuration, is disposed in the sealing-effective state;

the first sealing interface, established by the burst disk, is defeatable in response to application of a respective seal-defeating fluid pressure and only if the seal-defeating fluid pressure is equal to, or greater than, a seal-defeating minimum predetermined pressure that is respective to the burst disk, wherein the defeating is with effect that the flow controller configuration transitions from the first sealing-effective configuration to the second sealing-effective configuration; and the dissolution-stimulating material precursor, the flow passage, and the dissolvable barrier are co-operatively configured such that, while the flow controller configuration is configured in the second sealing-effective configuration, and downhole fluid is disposed in the flow passage, the dissolution-stimulating material precursor is stimulated by the downhole fluid, with effect that the dissolution-stimulating material is produced and becomes emplaced in a dissolution-effective communication with the dissolvable barrier for stimulating dissolution of the dissolvable barrier, with effect that the second sealing interface, established by the dissolvable barrier, is defeated.

31. The port sub as claimed in claim 30, wherein the dissolvable barrier is spaced apart from the burst disk to define a cavity therebetween.

32. The port sub as claimed in claim 30, wherein:

the dissolvable barrier includes a plurality of thinner areas; and the defeating of the sealing interface, established by the dissolvable barrier, is with effect that the dissolvable barrier is perforated through at least one of the plurality of thinner areas.

33. The port sub as claimed in claim 30, wherein the dissolvable barrier is co-operable with the dissolution-stimulating material such that, in response to contacting of the dissolution-stimulating material with the dissolvable barrier, a reactive process is effected such that the dissolution includes a reactive process.

34. The port sub as claimed in claim 30, wherein the dissolution-stimulating precursor is a corrosive material.

35. The port sub as claimed in claim 34, wherein the corrosive material comprises sulfuric acid and/or HF.

36. A method for delaying opening of a flow port of a port sub, the flow port being blocked by a rupture disk, a dissolvable barrier and a protective layer, the method comprising:

increasing a pressure of a fluid inside the port sub to rupture the first burst disk;

exposing, by rupturing the first burst disk, the dissolvable barrier to the fluid;

dissolving, by exposure to the fluid, at least one of a plurality of thinner areas of the dissolvable barrier to open a flow passage through the dissolvable barrier;

dissolving or rupturing the protective layer adjacent to the dissolvable barrier;

wherein:

the protective layer is a second burst disk; and the second burst disk has a rupture pressure less than that of the first burst disk.

37. A port assembly usable in a port sub, the port sub including a housing, a flow passage defined within the housing, and a flow port extending through the housing from the flow passage to an environment external to the housing, wherein at least a portion of the port assembly is emplaced within the flow port for controlling fluid communication between the flow passage and the environment external to the housing, the port assembly comprising:

a first burst disk for placement proximal to the flow passage, the first burst disk having a first burst disk outer surface facing away from the flow passage;

a dissolvable barrier adjacent to the first burst disk outer surface, and a second burst disk arranged adjacent to an outer surface of the dissolvable barrier wherein:

the port assembly is configurable in at least a closed configuration, a dissolve-ready configuration and an open configuration;

in the closed configuration, the first burst disk, the dissolvable barrier and the second burst disk are intact such that there is an absence of flow communication between the flow passage and an environment external to the port sub housing via the flow port;

in the dissolve-ready configuration, the first burst disk is defeated, while the dissolvable barrier remain and the second burst disk remain intact such that the dissolvable barrier is in flow communication with the flow passage while flow communication from the flow passage to the environment external to the port sub wall is prevented by at least the dissolvable barrier; and in the open configuration, the dissolvable barrier and the second burst disk are defeated such that flow communication from the flow passage to the external environment external via the flow port is established;

and transitioning of the port assembly from the dissolve-ready configuration to the open configuration is via an opening-ready configuration, wherein the opening-ready configuration is established after a predetermined breakthrough time effective for defeating at least a portion of the dissolvable barrier such that the second burst disk is disposed in flow communication with the flow passage; and transitioning from the opening-ready configuration to the open configuration is in response to rupturing of the second burst disk, the second burst disk configured to rupture at a rupture pressure that is less than the rupture pressure of the first burst disk.

38. The port assembly as claimed in claim 37, wherein the port assembly is configured such that while the port assembly is at least partially emplaced within the flow port of the port sub, and while the port assembly is disposed in the open configuration, flow communication between the flow passage and the environment external to the port sub is established along a flow path that is arranged offset to a central axis of the flow port that extends transverse to a longitudinal axis of the port sub.

39. The port assembly as claimed in claim 37, wherein the dissolvable barrier is spaced apart from the first burst disk outer surface to define a cavity therebetween.

40. The port assembly as claimed in claim 37, wherein:

the dissolvable barrier includes a plurality of thinner areas; and establishment of the opening-ready configuration is in response to defeating at least a portion of one of the plurality of thinner areas of the dissolvable barrier.

* * * * *